United States Patent [19]

Lee et al.

[11] 4,305,869
[45] Dec. 15, 1981

[54] TERPOLYMERS WITH IMPROVED HEAT DISTORTION RESISTANCE

[75] Inventors: Yoon C. Lee; Quirino A. Trementozzi, both of Springfield, Mass.

[73] Assignee: Monsanto Company, St. Louis, Mo.

[21] Appl. No.: 103,976

[22] Filed: Dec. 17, 1979

Related U.S. Application Data

[63] Continuation-in-part of Ser. No. 927,429, Jul. 29, 1978, which is a continuation-in-part of Ser. No. 865,049, Dec. 27, 1977, Pat. No. 4,197,376.

[51] Int. Cl.³ .......................... C08K 5/13; C08L 51/04
[52] U.S. Cl. .............................. 260/45.95 R; 525/74; 525/84; 526/272
[58] Field of Search .................. 260/45.95 R, 45.95 B; 526/272; 525/74, 84

[56] References Cited

U.S. PATENT DOCUMENTS

| | | | |
|---|---|---|---|
| 3,336,267 | 8/1967 | Zimmerman et al. | 526/209 |
| 3,642,949 | 2/1972 | Stafford et al. | 525/74 |
| 3,919,354 | 11/1975 | Moore et al. | 525/257 |
| 4,197,376 | 4/1980 | Lee et al. | 525/74 |

*Primary Examiner*—J. Ziegler
*Attorney, Agent, or Firm*—David Bennett; William J. Farrington; Paul D. Matukaitis

[57] ABSTRACT

Terpolymers of a monoalkenyl aromatic monomer, an unsaturated dicarboxylic acid anhydride and an alkyl methacrylate are found to possess an unexpectedly high heat distortion temperature over a certain range of composition.

9 Claims, No Drawings

TERPOLYMERS WITH IMPROVED HEAT DISTORTION RESISTANCE

BACKGROUND OF THE INVENTION

This is a continuation-in-part of U.S. Application Ser. No. 927,429 filed July 29, 1978 which is itself a continuation-in-part of Application Ser. No. 865,049, filed Dec. 27, 1977, now U.S. Pat. No. 4,197,376.

This invention relates to styrene/maleic anhydride/methacrylate terpolymers with a narrow compositional range.

Styrenic polymers, which have seen broad acceptance in a variety of uses, begin to soften and lose their dimensional integrity under stress at temperatures below those at which plastics are required to operate for a number of significant applications.

A styrenic terpolymer composition has now been discovered that produces a surprising improvement in the heat distortion temperature by comparison with polystyrene making it suitable for a wide range of uses for which polystyrene is disqualified.

DISCUSSION OF THE PRIOR ART

The influence of maleic anhydride on the heat distortion temperature of a styrenic polymer is very well known in the art and methods of polymerizing styrene and maleic anhydride are described for example in U.S. Pat. Nos. 2,971,939; 2,989,517; 3,336,267 and British Pat. No. 1,234,395.

It is also known that methyl methacrylate can be copolymerized with styrene and maleic anhydride, for example from U.S. Pat. No. 3,336,267, which discloses terpolymers with from 0–90% of a $C_1$ to $C_4$ methacrylate.

The parent application Ser. No. 927,429 showed that with rubber-modified terpolymers of styrene, maleic anhydride and methyl methacrylate showed certain specific advantages over rubber modified styrene/maleic anhydride copolymers for a narrow range of methacrylate contents. It has now been found that most of those same advantages are obtained even if the rubber component is omitted.

Thus if a specified amount of a methacrylate monomer within a closely defined range is incorporated in the polymer, a surprising further improvement in the heat distortion temperature of the polymer is obtained without significant sacrifice in other desirable properties. This improvement does not however, extend across the full range of compositions described in the art but appears to be confined to the narrow compositional range hereinbelow specified.

Additionally it is found that the incorporation of the methacrylate termonomer has the effect of raising the tensile strength and the gloss of the polymer in a most advantageous manner making the polymeric product more attractive for a broad spectrum of applications.

STATEMENT OF THE INVENTION

The present invention provides a polymeric composition comprising a terpolymer of from 45 to 83% by weight of a monoalkenyl aromatic monomer, from 15 to 35% by weight of an unsaturated dicarboxylic acid anhydride and from 2 to 20% by weight of a copolymerizable $C_1$ to $C_3$ alkyl ester of methacrylic acid.

It has been found that the presence of the $C_1$–$C_3$ alkyl methacrylate component has particularly surprising consequences and that the range described above which is mandated by a combination of factors, defines a group of novel terpolymers with unexpected and advantageous properties.

It is found for example that the incorporation of the methacrylate comonomer increases the distortion temperature under load (DTUL) of the polymer. The effect of maleic anhydride on DTUL was known but it was not known however, that a further improvement can be obtained if a methacrylate comonomer is also present. However, this improvement is only obtained over a narrow range and above about 20% by weight methacrylate in the polymer, the advantage is lost.

A second advantage is that other physical properties such as impact strength, tensile strength, elongation at fail and gloss of the polymer apparently increase with the amount of the methacrylate in the composition.

The utility of the above advantages is however, circumscribed by the third factor which is that addition of a methacrylate comonomer is found to reduce the thermal decomposition temperature of the polymer. The effect of this can be controlled to some extent by addition of certain stabilizers but it is found that above about 20% by weight of the methacrylate comonomer it is not possible to obtain a polymer that is stable at its processing temperature for the length of time required for conventional forming processes.

Thus, the interplay of these three factors defines in a totally unexpected fashion a range of terpolymers with very advantageous properties.

The preferred polymer compositions within this range will depend largely on the properties desired. Generally, however, the polymers containing from 4 to 10% by weight of the methacrylate comonomer are preferred. This is because the heat distortion temperature, as is explained later, initially increases rapidly with methacrylate content to a broad peak between about 7 and 15% content and thereafter begins a gradual decline. Thus, roughly the same improvement is generally obtained at 7% as at 15% methacrylate content. Additionally, it is preferred to retain the thermal stability as high as possible so as to permit more flexibility in the application of forming processes to the polymers.

POLYMER COMPOSITION

The polymeric composition of the invention comprises a terpolymer of from 45 to 83% (preferably from 50 or 60 to 75%) by weight of a monoalkenyl aromatic monomer, from 15 to 35% (preferably 20–30%) by weight of an unsaturated dicarboxylic acid anhydride, and from 2 to 20% (preferably 4 to 10%) by weight of a $C_1$ to $C_3$ alkyl methacrylate ester.

The monoalkenyl aromatic monomer is preferably styrene but styrene derivatives such as alpha-methylstyrene, p-tert-butyl styrene, chlorostyrene, 2,4-dichlorostyrene and 2-chloro-4-methyl-styrene may be substituted for styrene in whole or in part if desired.

The unsaturated dicarboxylic acid anhydride is most preferably maleic anhydride though any of the homologues of maleic anhydride such as itaconic, citraconic and aconitic anhydrides can also be used.

The terpolymer further comprises a $C_1$ to $C_3$ alkyl ester of methacrylic acid. The methacrylic ester can be methyl methacrylate, ethyl methacrylate or propyl methacrylate. The preferred monomer is methyl methacrylate.

The polymeric composition is conveniently prepared by dissolving the monoalkenyl aromatic component and the methacrylate ester in a suitable solvent, and then polymerizing the solution with the anhydride component in the manner described in, for example, U.S. Pat. Nos. 2,971,939, 3,336,267 and 3,919,354 which are incorporated herein by reference.

A suitable polymerization schedule can be devised on the basis of the relative reactivities of the monomers. Typical schedules involve preparing an initial reaction mixture comprising a solvent, the bulk of the alkenyl aromatic monomers, a very small amount (or none) of the anhydride monomer and the major proportion of the methacrylate termonomer. The balance of the monomers is added slowly during the polymerization.

Since as has been indicated above, the addition of methyl methacrylate gives rise to reduction in the temperature at which thermal decomposition of the polymer begins, it is advantageous to incorporate an antioxidant stabilizer into the composition to provide an added degree of protection during processing.

In protecting the polymer against thermal degradation, it is important from a practical point of view that the stability obtained has a reasonable duration. In the laboratory stability is often judged by the performance of the polymer in the molding of a small test-piece. In a commercial operation however, the polymer may well spend several minutes at molding temperatures and an acceptable polymer has to have stability not only at high temperatures but for prolonged periods at high temperatures.

A wide range of antioxidant stabilizers for styrenic polymers is available but particularly satisfactory results can be obtained using 1,3,5-trimethyl-2,4,6-tris[3,5-di-tert-butyl-4-hydroxybenzyl]benzene and 2,2'-methylene-bis-(4-methyl-6-tert-butyl phenol)terephthalate.

The total amount of stabilizer that may be used is not critical but typically up to 5% by weight based on the total composition is found to be adequate. In general 0.1 to 2% is in the range chosen for practical advantage.

The polymeric composition can contain other components such as for example, up to 50% by weight of ungrafted rubber components such as the so-called block rubbers and radial block rubbers, and effective amounts of additives such as flame retardants, smoke suppressants, U.V. stabilizers, lubricants, antistatic additives, colorants, fillers and the like.

The terpolymers of the invention are useful per se but they are also effective as blends in weight proportions of from 20:80 to 80:20, with ABS polymers, that is polymers obtained by the polymerization of acrylonitrile and styrene generally in weight proportions of from 20:80 to 40:60 in the presence of a diene rubber such as polybutadiene. The amount of the diene rubber in an ABS polymer can be 5-90% but more frequently it is from 10-50% by weight. Structurally an ABS polymer comprises a grafted diene rubber substrate dispersed in a matrix of a styrene acrylonitrile copolymer and it is understood that this matrix is sometimes augmented by separately prepared styrene/acrylnitrile copolymer of α-methyl styrene/acrylonitrile copolymers.

DESCRIPTION OF THE PREFERRED EMBODIMENTS

The present invention is further described by reference to the following Examples which are for the purposes of illustration only and are not intended to imply any limitation of the scope of the invention.

The Examples illustrate the results of varying the amount of the methacrylate ester in the composition and the surprising advantages obtained by maintaining the level in the range of 2 to 20% by weight.

In each Example the components were formed into samples which were then tested to determine the distortion temperature under load (DTUL) under a load of 18.6 kg/sq. cm. (ASTM D-648), the glass transition temperature, (Tg), and in some cases the Izod Impact Strength, (ASTM D-256).

The Izod impact strengths were measured using $3.2 \times 12.7 \times 63.5$ mm unannealed compression molded samples, notched 2.54 mm.

The DTUL values given are for $3.2 \times 12.7 \times 127$ mm unannealed compression molded samples tested under a 18.6 kg/sq.cm. stress and have $\pm 1°$ C. accuracy.

Unannealed compression molded samples were chosen in preference to injection molded samples so as to eliminate the variations that occur in the preparation of injection molded samples which become partially oriented during the forming process. The choice of unannealed compression molded samples which are not oriented during formation, eliminates one result-affecting variable and makes the comparison more significant.

The glass transition temperature, Tg, is obtained from dynamic mechanical properties measured on a mechanical spectrometer.

The compositions are all expressed as percentages by weight. The maleic anhydride content was determined by titration and is accurate to $\pm 0.7\%$ and the methyl methacrylate content was determined by elemental analysis. Styrene content is by differences.

These Examples show the variation of the critical DTUL and Tg properties with the maleic anhydride content in the claimed range.

Included are three comparative examples (1, 7 and 8) which show the same properties with zero termonomer and with 14.0 and 13.5% respectively of methyl acrylate and ethyl acrylate. These acrylate contents were chosen so as to point out that this DTUL improvement described herein is not a feature that is shared by the acrylates but is restricted to the methacrylate.

PREPARATION OF METHYL METHACRYLATE TERPOLYMER

This process is actually that used to prepare the terpolymer of Example 4 but essentially the same technique, with variation of the actual amounts of monomers used, was used for all.

An agitated resin kettle was charged with 939 gm of methyl ethyl ketone (MEK) 469 gm of toluene, 751 gm of styrene and 236 gm of methyl methacrylate. To this mixture was charged 26.8 gm of maleic anhydride and 0.95 gm of t-butyl peracetate dissolved in 100 gm of MEK. The mixture was heated to 105° C. and maintained at that level while late additions of (1) a solution of 320 gm of maleic anhydride and 1.42 gm of t-butyl peroctoate dissolved in 400 gm of MEK and (2) 241 gm of styrene monomer and 77 gm of MEK were begun. The late additions were completed in a 5.5 hour period after which the reaction was held at the reaction temperature for a further ¼ hour before 0.63 gm of hydroquinone and 4.73 gm of 1,3,5 trimethyl-2,4,6 tris (3,5-di-ter-butyl-4 hydroxy benzyl) benzene (antioxidant) in 40 grams of MEK were added. The reaction mixture was then devolatilized at 200° C. under vacuum to isolate the polymer. The polymer was extruded at 230° C. and compression molded into specimens for evaluation.

PREPARATION OF METHYL ACRYLATE TERPOLYMER (Example 7)

An agitated resin kettle was charged with 1345 gm of methyl ethyl ketone (MEK), 595 gm of styrene and 236 gm of methyl acrylate. To this mixture was charged 18.9 gm of maleic anhydride and 0.95 gm of t-butyl peracetate dissolved in 100 gm of MEK. The mixture was heated to 105° C. and maintained at that level while late additions of (1) a solution of 304 gm of maleic anhydride and 1.42 gm of t-butyl peroctoate dissolved in 380 gm of MEK and (2) 421 gm of styrene monomer were begun. The late additions were completed in a 5.5 hour period after which the reaction was held at the reaction temperature for a further ¼ hour before 0.63 gm of hydroquinone and 4.73 gm of 1,3,5 trimethyl-2,4,6 tris (3,5-di-ter-butyl-4 hydroxy benzyl) benzene (antioxidant) in 100 grams of MEK were added. The reaction mixture as then devolatilized at 200° C. under vacuum to isolate the polymer. The polymer was extruded at 230° C. and compression molded into specimens for evaluation.

PREPARATION OF ETHYL ACRYLATE TERPOLYMER (Example 8)

An agitated resin kettle was charged with 1345 gm of methyl ethyl ketone (MEK), 469 gm of toluene, 603 gm of styrene and 236 gm of ethyl acrylate. To this mixture was charged 18.9 gm of maleic anhydride and 0.95 gm of t-butyl peracetate dissolved in 100 gm of MEK. The mixture was heated to 105° C. and maintained at that level while late additions of (1) a solution of 304 gm of maleic anhydride and 1.42 gm of t-butyl peroctoate dissolved in 380 gm of MEK and (2) 413 gm of styrene monomer were begun. The late additions were completed in a 5.5 hour period after which the reaction was held at the reaction temperature for a further ¼ hour before 0.63 gm of hydroquinone and 4.73 gm of 1,3,5 tri-methyl-2,4,6 tris (3,5-di-ter-butyl-4-hydroxy benzyl) benzne (Antioxidant) in 40 grams of MEK were added. The reaction mixture was then devolatilized at 200° C. under vacuum to isolate the polymer. The polymer was extruded at 230° C. and compression molded into specimens for evaluation.

The properties and compositions of the polymers prepared according to the above procedures are set out in Table I below.

TABLE 1

| EXAMPLE | POLYMER COMPOSITION | | | | | POLYMER PROPERTIES | |
|---|---|---|---|---|---|---|---|
| | Sty | MA | MM | MEA | ETA | DTUL, °C. | Tg° C. |
| 1 | 74.5 | 25.5 | — | — | — | 137 | 171 |
| 2 | 69.0 | 25.5 | 5.5 | — | — | 138.5 | 173 |
| 3 | 67.5 | 25.5 | 7.0 | — | — | 140 | 174 |
| 4 | 60.5 | 25.5 | 14.0 | — | — | 141 | 175 |
| 5 | 57.5 | 25.5 | 17.0 | — | — | 139 | — |
| 6 | 53.5 | 25.5 | 21.0 | — | — | 136 | 169 |
| 7 | 60.5 | 25.5 | — | 14.0 | — | 130 | 158 |
| 8 | 61.0 | 25.5 | — | — | 13.5 | 127 | 156 |

Sty: Styrene
MA: Maleic Anhydride
MM: Methyl Methacrylate
MEA: Methyl Acrylate
ETA: Ethyl Acrylate From the above it can clearly be seen that a significant DTUL improvement is obtained by incorporating 2–20% methyl methacrylate into the polymer. The highest value obtained was at 14% of methyl methacrylate and the use of similar amounts of methyl acrylate and ethyl acrylate had a disastrous effect on DTUL as is clearly shown.

The DTUL variation is faithfully echoed by Tg and again the unique character of the methacrylate termonomer is clearly shown.

EXAMPLES 9–19

These Examples show the effect of blending the terpolymers of the invention with ABS polymers. Again the DTUL improvement is shown and in some cases, especially at lower rubber levels, the methyl methacrylate also appears to have a significant and beneficial effect on the impact strength.

The polymers of Examples 1–6 were banbury-compounded with various combinations of ABS polymers identified as follows:

α-MS/AN—a copolymer of α-methylstyrene and acrylonitrile containing approximately 28% AN and up to 10% of styrene.

ABS-I—prepared by the graft suspension polymerization of acrylonitrile and styrene in a weight ratio of 28:72 in the presence of polybutadiene. ABS-I contains 14% by weight of polybutadiene.

ABS-2—prepared by the graft emulsion polymerization of acrylonitrile and styrene in a weight ratio of 30:70 in the presence of polybutadiene. ABS-2 contains 40% by weight of polybutadiene.

The properties of the blends obtained are set forth in Table II below.

TABLE II

| Polymer Composition (% by wt.) | Ex. 9 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|
| COMPOSITION AND PROPERTIES OF BLENDS | | | | | | | | | | |
| Terpolymer of: | | | | | | | | | | |
| Ex. 1 | 48 | — | — | — | — | 50 | — | — | — | — |
| Ex. 2 | — | — | — | — | — | — | 50 | — | — | — |
| Ex. 3 | — | 48 | — | — | — | — | — | — | — | — |
| Ex. 4 | — | — | 48 | — | — | — | — | 50 | — | — |
| Ex. 5 | — | — | — | 48 | — | — | — | — | 50 | — |
| Ex. 6 | — | — | — | — | 48 | — | — | — | — | 50 |
| ASB-1 (CLP-610) | — | — | — | — | 9.2 | 9.2 | 9.2 | 9.2 | 9.2 | 9.2 |
| ABS-2 (40-UX) | 52 | 52 | 52 | 52 | 30 | 30 | 30 | 30 | 30 | 30 |
| α-MS/AN (CNA-63) | — | — | — | — | 10.8 | 10.8 | 10.8 | 10.8 | 10.8 | 10.8 |
| % Rubber (Total) | 20 | 20 | 20 | 20 | 20 | 12.8 | 12.8 | 12.8 | 12.8 | 12.8 |
| Polymer Properties | | | | | | | | | | |
| DTUL, °C. | 109 | 109 | 112 | 110 | 108 | 113 | 113 | 115 | 114 | 111 |
| Izod, J/M notched | 23.4 | 22.9 | 22.9 | 22.9 | 24.5 | 54.8 | 57.0 | 66.0 | 65 | 98.5 |

The above Examples are included to illustrate the scope of the invention and are intended to imply no limitation thereof. It is foreseen that many minor variations and modifications could be made without departing from the essential spirit of the invention and it is intended that all such variations and modifications should be embraced within its general purview.

What is claimed is:

1. A polymeric composition comprising a terpolymer of from 45 to 83% by weight of a monoalkenyl aromatic monomer, from 15 to 35% by weight of an unsaturated dicarboxylic acid anhydride and from 2 to 20% by weight of a $C_1$ to $C_3$ alkyl methacrylate ester.

2. The terpolymer composition according to claim 1 in which the amount of $C_1$ to $C_3$ alkyl methacrylate is from 4 to 10% by weight of the terpolymer.

3. The terpolymer composition according to claim 1 in which the $C_1$ to $C_3$ alkyl methacrylate is methyl methacrylate.

4. A terpolymer composition comprising from 50 to 78% of a monoalkenyl aromatic monomer, from 20 to 30% of an unsaturated dicarboxylic acid anhydride and from 2 to 20% of a $C_1$ to $C_3$ alkyl methacrylate, all percentages being by weight.

5. The terpolymer composition of claim 4 that includes up to 5% by weight of an effective antioxidant stabilizer.

6. The terpolymer composition of claim 5 in which the antioxidant stabilizer comprises 1,3,5-trimethyl-2,4,6-tris(3,5-di-tert-butyl-4-hydroxybenzyl)benzene.

7. A terpolymer composition comprising a terpolymer of from 60 to 76% of styrene, 20 to 30% of maleic anhydride and 4 to 10% of methyl methacrylate, said composition also comprising up to 2% of 1,3,5-trimethyl-2,4,6-tris(3,5-di-tert-butyl-4-hydroxybenzyl)benzene; all parts being by weight.

8. A polyblend comprising:
   A. from 20 to 80% by weight of an ABS polymer consisting essentially of:
      (1) a matrix copolymer; and
      (2) a diene rubber substrate grafted with a superstrate copolymer wherein the rubber substrate provides from 5 to 90% of the weight of the ABS polymer and the matrix polymer and the superstrate polymer are each formed by the polymerization of styrene and acrylonitrile in a weight ratio of from 60:40 to 80:20; and
   B. from 80 to 20% by weight of a terpolymer according to claim 1.

9. A polyblend comprising:
   A. from 80 to 20% by weight of an ABS polymer consisting essentially of:
      (1) a matrix copolymer; and
      (2) a diene rubber grafted with a superstrate copolymer wherein the rubber substrate provides from 10 to 50% of the weight of the ABS polymer and the matrix polymer and the superstrate polymer are each formed by the polymerization of styrene and acrylonitrile in a weight ratio of from 60:40 to 80:20; and
   B. from 20 to 80% by weight of a terpolymer composition according to claim 7.

* * * * *